Dec. 19, 1922.
W. J. BAXTER.
COMBINED RAKE AND PITCHFORK
FILED SEPT. 13, 1921.
1,439,220.
2 SHEETS—SHEET 2.
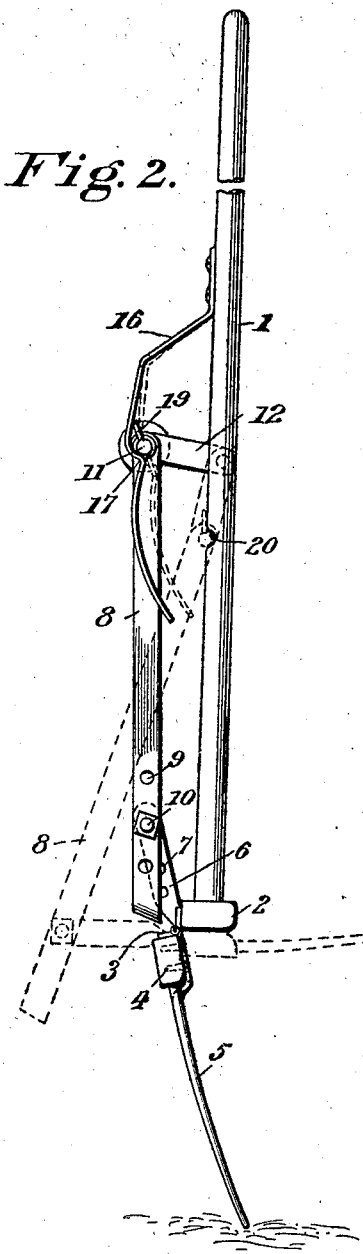
Inventor
*Willis J. Baxter*
By *William J. Jacobi*
Attorney Patented Dec. 19, 1922.

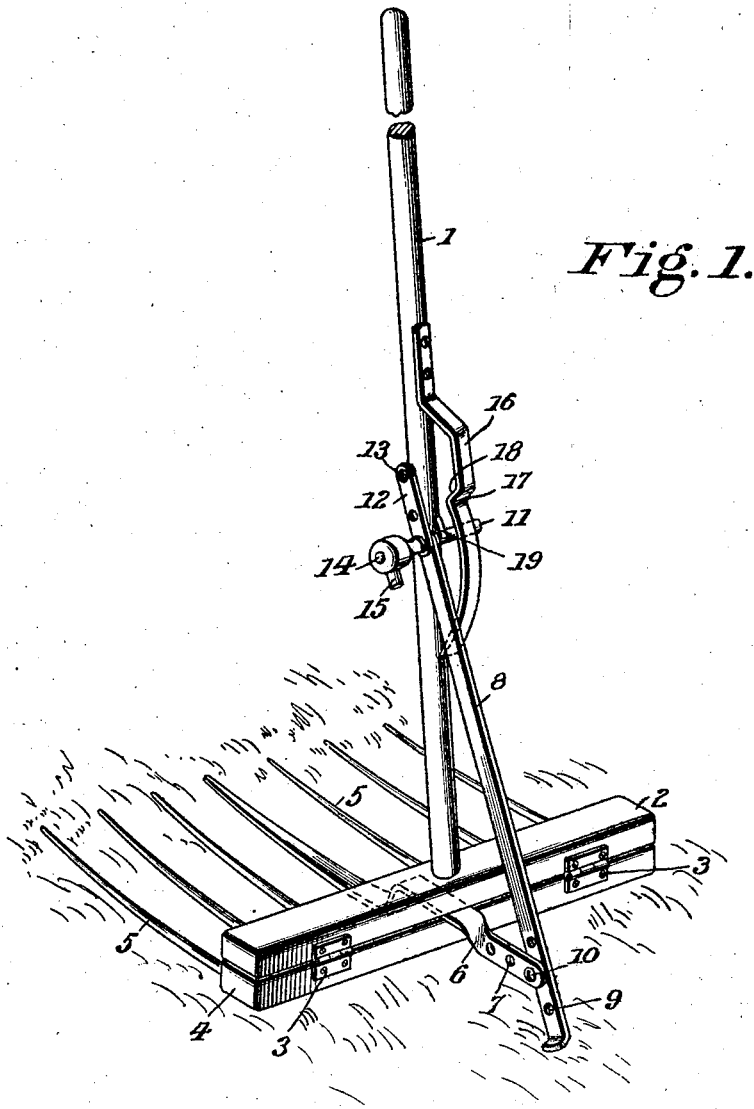

1,439,220

UNITED STATES PATENT OFFICE.

WILLIS J. BAXTER, OF WAYNESVILLE, NORTH CAROLINA.

COMBINED RAKE AND PITCHFORK.

Application filed September 13, 1921. Serial No. 500,392.

*To all whom it may concern:*

Be it known that WILLIS J. BAXTER, a citizen of the United States, residing at Waynesville, in the county of Haywood and State of North Carolina, has invented certain new and useful Improvements in a Combined Rake and Pitchfork, of which the following is a specification.

This invention relates to new and useful improvements in combination agricultural implements and more particularly to a combination rake and pitchfork. The primary object of the invention resides in providing a device which may be quickly and readily converted from a pitchfork to a rake and vice versa when desired.

Still another object of the invention resides in providing a device which is firm and durable in either disposition to use and one which is simple and durable in construction, inexpensive to manufacture and one which will be very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application—

Figure 1 is a perspective view of the device set up for operation as a rake.

Figure 2 is a side elevation of the same when disposed for operation as a pitchfork, and Figure 3 is a perspective view of one of the details of the device removed.

In describing the invention I shall refer to the drawings in which similar reference characters designate corresponding parts throughout the several views, and in which 1 designates an elongated handle, to the outer end of which is secured a T-head 2. Hingedly secured to the T-head as shown at 3 is a rake-head 4 carrying the tangs 5. When the rake-head 4 is disposed so that one face therof is flat against the outer face of the T-head 2 as shown in Figure 1 the device is adapted for use as a rake and when said rake-head 4 is disposed outwardly to a position as shown in Figure 2 the device is adapted for use as a pitchfork. My invention also contemplates the provision of means for locking the rake-head in its two positions as a rake and as a pitchfork, the construction of the same being described in full herebelow.

Secured to the inner face of the rake-head 4 and disposed between said rake-head and the T-head 2 is a metallic arm 6 which is formed integral with and constitutes an extension of a central tang of the rake-head. This projection 6 is twisted at a point just beyond the T-head 2 and is provided with a plurality of openings 7. An operating lever 8 is provided, the outer end of which is also provided with a plurality of openings 9 and a pin 10 is extended through one of the openings 9 and one of the openings 7 whereby to provide pivotal connection between the lever 8 and the projection 6. The provision of openings 7 and 9 allows for adjustment between the members 6 and 8, according to the desired movement of the rake-head with respect to the T-head and handle.

The inner end of the lever 8 is pivotally connected through the medium of a pin 11 to an arm 12 which is pivoted as at 13 to the handle 1. This arm 12 is also provided with a plurality of openings to provide for adjustment of the pivotal connection of the lever 8 therewith. The pin 11 has a knob or the like 14 carried on one end thereof with a lateral finger piece 15 thereon, for a purpose to be here and after and more particularly described.

Secured to the handle 1 about midway of its length and bent upwardly to extend for a portion of the length of the handle 1 spaced therefrom is a leaf spring member 16. This leaf spring member is disposed midway of its length as shown at 17 to provide substantially a notch or stop 18 on the under face of said spring member. In the disposition of the lever 8 rearwardly to throw the rake-head to a position as a pitchfork, as shown in Figure 2, the pin 11 is adapted to contact with the depressed portion 17 and rest in the notch 18, thus retaining the rake-head in the position as a pitchfork for operation as such.

Removably secured to the pin 11 is a laterally extending stud 19 and when it is desired to dispose the rake to change the formation of the device from a pitchfork to a rake, it is only necessary to grasp the knob 14 and give it a turn by turning upon the projection 15 thereof. The turning of this knob turns the pin 11 whereby the lateral projection 19 will come in contact with the depressed portion 17 of the spring member 16, lifting the latter and permitting the lever 8 to be readily pushed forward. By pushing the lever 8 forward the rake-head will be swung on its hinges to a position as shown in Figure 1 forming a rake. In the forward movement of the lever 8, the pin 11 makes a forward and downward movement and a notch or recess 20 is formed in the handle to receive this pin therein. When received in this notch, the rake-head is locked in its position as shown in Figure 1 against casual disengagement. When in this position the device may be readily used as a rake and the same will not be casually disengaged. When it is desired to form the device into a pitchfork it is only necessary for the operator to grasp the knob 14 and raise the same upwardly and rearwardly whereupon the rake-head will be disposed outwardly to form a pitchfork formation and the pin 11 will be received under spring tension in the notch or recess 18 of the spring member 16, to be retained in this position until manually disposed to another position.

It will be seen that I have provided a device which may be quickly and readily formed into a rake or pitchfork as may be desired and which when positioned in either formation will be effectively held against casual displacement and which will positively carry out the purposes for which the same is designed.

It will still further be seen that I have provided a simple, inexpensive and efficient means for carrying out the objects of the invention.

While I have particularly described the elements best adapted to perform the functions set forth, it is obvious that various changes in form, proportion, and in the minor details of construction may be resorted to without departing from the spirit or sacrificing any of the principles of the invention.

Having thus described my invention, what I claim is:

1. A device of the class described comprising a handle member having a T-head thereon, a rake-head hinged to said T-head, means for locking said rake-head in a position to form a rake and additional means for moving said rake-head and locking the same in position to form a pitchfork.

2. A device of the class described comprising a handle member having a T-head secured thereon, a rake-head hinged to said T-head, a lever connected with said rake-head, means for actuating said lever and locking the same in a position to dispose the rake-head in a position in formation as a rake and additional means for locking said lever in position to form a rake into a pitchfork with respect to said handle.

3. A device of the class described comprising a handle member having a T-head at one end thereof, a rake-head hinged to said T-head, a lever pivotly connected with said rake-head to dispose the latter to positions forming a rake and a pitchfork, and means for locking said lever in its adjusted positions.

4. A device of the class described comprising a handle member having a T-head thereon, a rake-head hinged to said T-head, an arm extending from said rake-head, a lever having pivotal connection with said arm whereby to dispose said rake-head in positions to form a rake and a pitchfork respectively, means for manually actuating said lever and additional means in connection with the last referred to means for locking said lever in its adjusted positions.

5. A device of the class described comprising a handle member having a T-head formed at one end thereof, a rake-head hinged to said T-head, an arm secured to said rake-head, a lever adjustably and pivotly connected to said arm to dispose said rake-head to positions forming a rake and a pitchfork respectively in connection with said handle, an additional arm fulcrumed on said handle and having pivotal connection with the opposite end of said lever, means for actuating said lever and additional means in connection with the last mentioned means for locking said lever in its adjusted positions.

6. A device of the class described comprising a handle member having a T-head formed at one end thereof, a rake-head hinged to said T-head, an arm secured to said rake-head, a lever adjustably and pivotly connected to said arm to dispose said rake-head to positions forming a rake and a pitchfork respectively in connection with said handle, an additional arm fulcrumed on said handle and having pivotal connection with the opposite end of said lever, means for actuating said lever, spring means secured to said handle and cooperating with the last mentioned means for locking the lever in its position and disposing the rake-head as a pitchfork and means formed in the handle for locking the last mentioned means in a position disposing the rake-head in formation as a rake.

7. A device of the class described comprising a handle member having a T-head formed at one end thereof, a rake-head hinged to said T-head, an arm secured to said rake-head, a lever adjustably and pivotly connected to said arm to dispose said rake-head to positions forming a rake and a pitchfork respectively in connection with said handle, an additional arm fulcrumed on said handle and having pivotal connection with the opposite end of said lever, means for manually actuating said lever, a leaf spring member secured to the handle and cooperating with the last mentioned means to retain said lever and parts actuated thereby in one position, said handle member being also provided with means cooperating with the last mentioned means whereby to lock said lever and parts operated thereby in another position.

8. A device of the class described comprising a handle member having a T-head formed at one end thereof, a rake-head hinged to said T-head, a lever having pivotal connection with said rake-head to dispose the latter to a position forming a rake and also to a position forming a pitchfork with respect to the handle, an arm fulcrumed on said handle and having adjustable and pivotal connection with the opposite end of said lever, an extension formed on the pivotal connection between said lever and said arm, means for manually rotating the aforesaid pivotal connection, a leaf spring locking member secured to said handle and having a notch formed therein adapted to receive the extension on said pivotal connection, a projection on said extension adapted to release the spring locking member upon the rotation of said pivotal connection, whereby to dispose said lever in one position and means formed on said handle to receive the extension of said pivotal connection to lock the lever in another position.

In testimony whereof I affix my signature.

WILLIS J. BAXTER.